(12) United States Patent
Son et al.

(10) Patent No.: US 10,761,816 B2
(45) Date of Patent: Sep. 1, 2020

(54) METHOD AND SYSTEM FOR DETERMINING INTERFACE COMPATIBILITY BASED ON COMPONENT MODEL

(75) Inventors: Kyoung-Ho Son, Suwon-si (KR); Ja-Gun Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1798 days.

(21) Appl. No.: 12/751,470

(22) Filed: Mar. 31, 2010

(65) Prior Publication Data

US 2010/0192125 A1 Jul. 29, 2010

Related U.S. Application Data

(63) Continuation of application No. PCT/KR2008/001351, filed on Mar. 10, 2008.

(30) Foreign Application Priority Data

Oct. 1, 2007 (KR) .................. 10-2007-0098764

(51) Int. Cl.
*G06F 9/06* (2006.01)
*G06F 8/36* (2018.01)

(52) U.S. Cl.
CPC ..................... *G06F 8/36* (2013.01)

(58) Field of Classification Search
CPC ....................................................... G06F 8/36
USPC ....................................................... 717/120
See application file for complete search history.

(56) References Cited

U.S. PATENT DOCUMENTS

| 5,579,509 A | 11/1996 | Furtney et al. |
| 6,226,692 B1 | 5/2001 | Miloushev et al. |
| 2002/0062463 A1* | 5/2002 | Hines .............................. 714/38 |
| 2003/0093551 A1* | 5/2003 | Taylor ..................... G06F 8/36 |
| | | 709/237 |
| 2004/0015833 A1* | 1/2004 | Dellarocas et al. .......... 717/106 |
| 2007/0050426 A1* | 3/2007 | Dubal et al. ................. 707/201 |
| 2007/0300204 A1* | 12/2007 | Andreev et al. .............. 717/104 |

FOREIGN PATENT DOCUMENTS

| KR | 10-2002-0097147 | 12/2002 |
| KR | 10-2005-0043982 | 5/2005 |

OTHER PUBLICATIONS

International Search Report dated Jul. 8, 2008, in corresponding International Application No. PCT/KR2008/001351(10 pages).

* cited by examiner

Primary Examiner — Idriss N Alrobaye
Assistant Examiner — Brooke J Taylor
(74) Attorney, Agent, or Firm — NSIP Law

(57) ABSTRACT

A method and system for determining interface compatibility between components are provided. In the system for determining interface compatibility in component model-based software design, the system includes a compatibility rule manager managing interface compatibility rules, and an interface compatibility validator verifying interface compatibility between components based on the interface compatibility rules.

19 Claims, 13 Drawing Sheets

[Fig. 1]
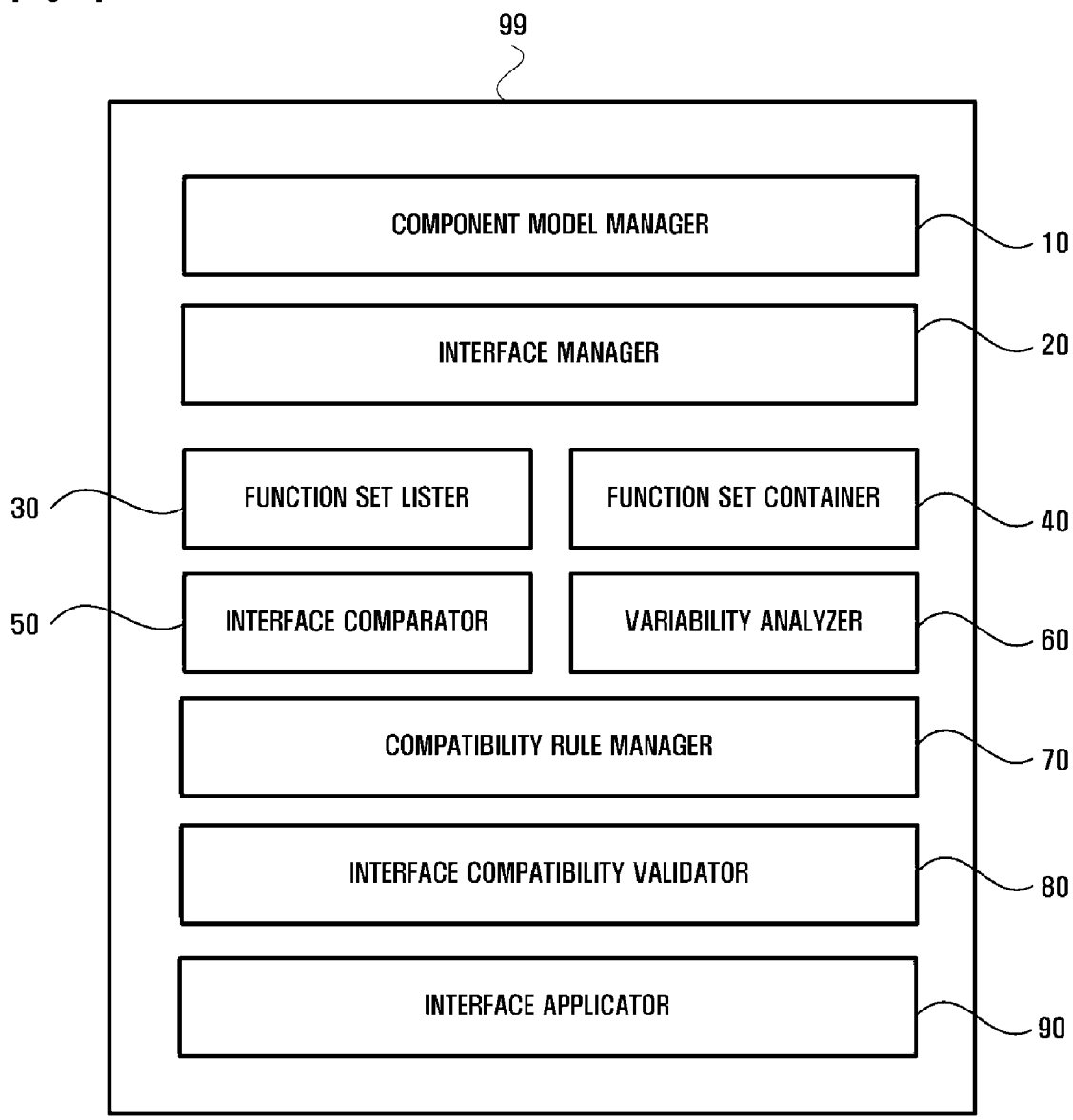
[Fig. 2]
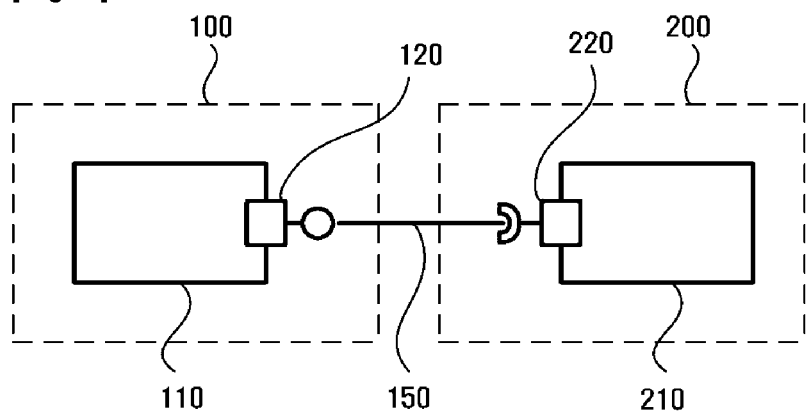

[Fig. 3]
| FORM OF DESCRIPTION | SYNTAX |
|---|---|
| SYMBOL DESCRIPTION | Interface [Interface name] {<br>    function symbols ;<br>} |
| HEADER MAPPING | Interface [Interface name] {<br>header-file = [header file location];<br>...<br>header-file = [header file location];<br>} |
[Fig. 4]
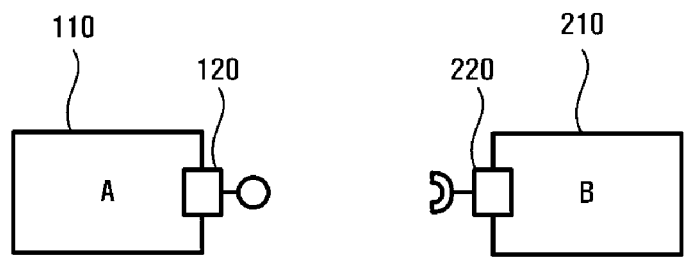
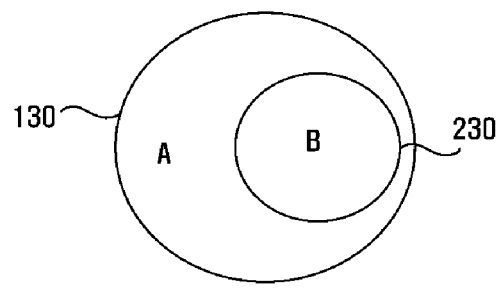
[Fig. 5]
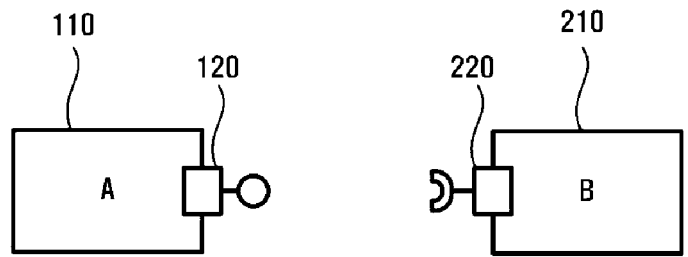
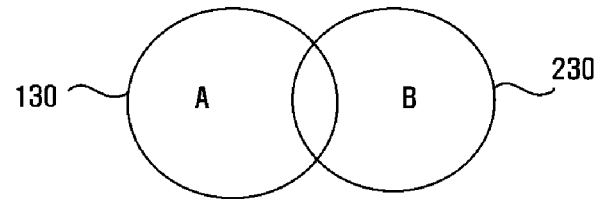

[Fig. 6]
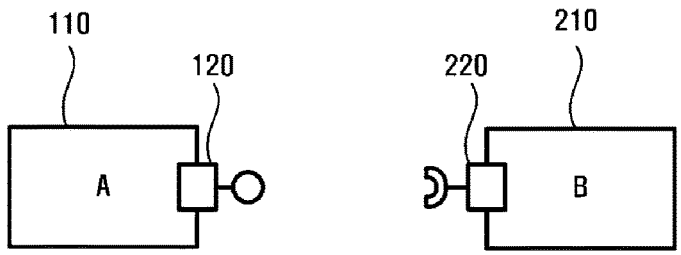
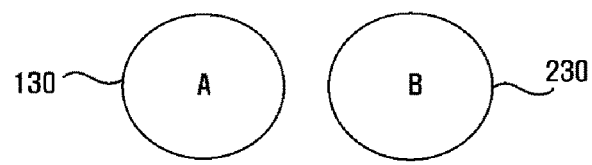
[Fig. 7]
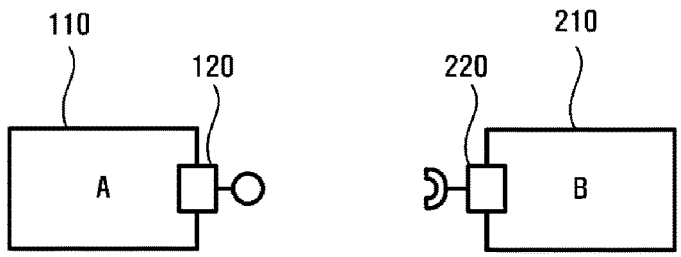
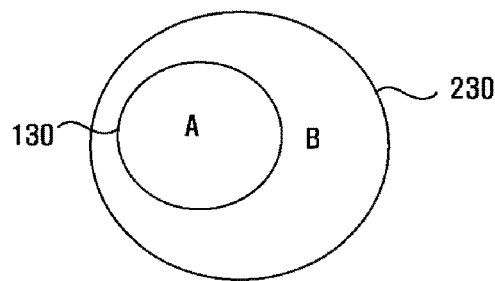
[Fig. 8]
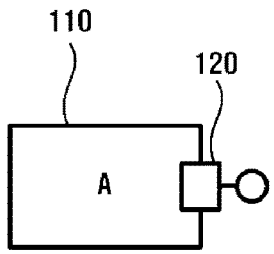
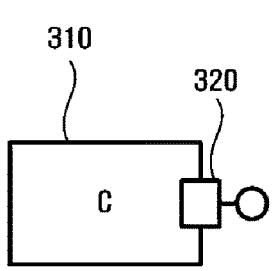
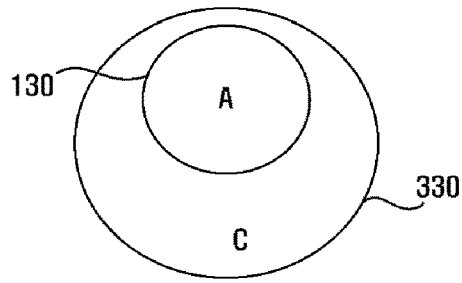

[Fig. 9]
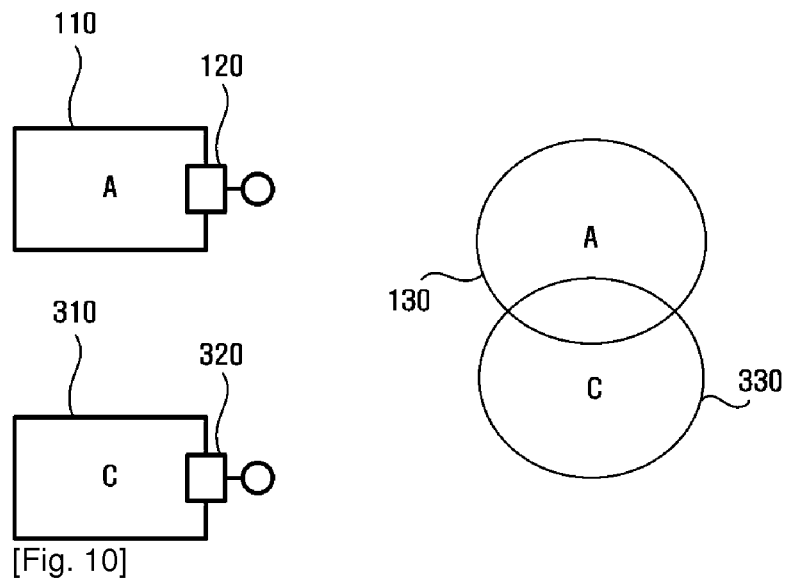
[Fig. 10]
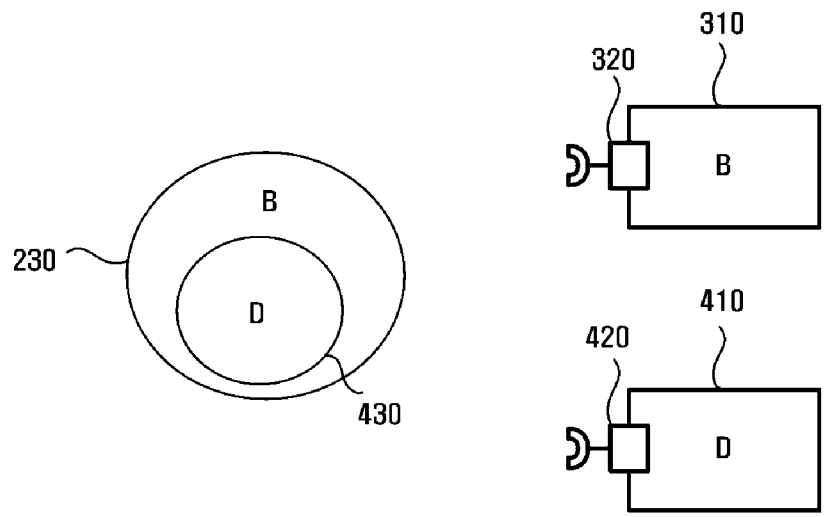
[Fig. 11]
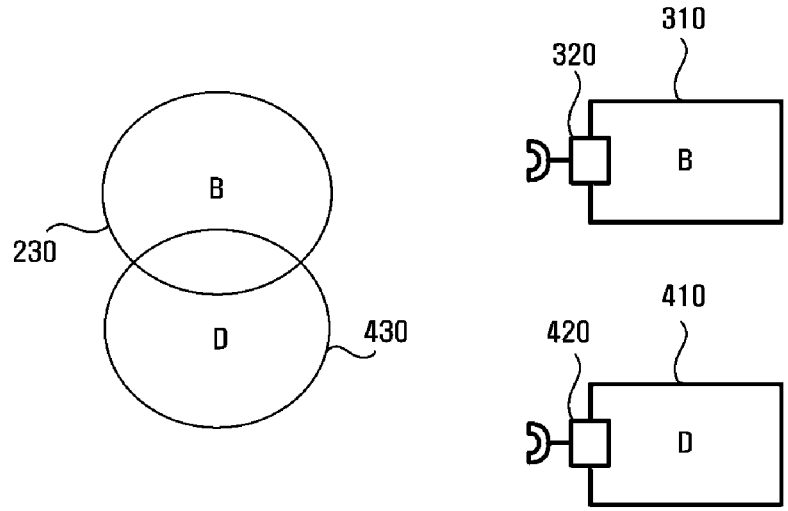

[Fig. 12]
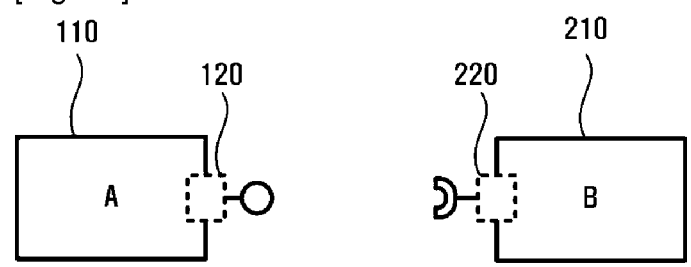
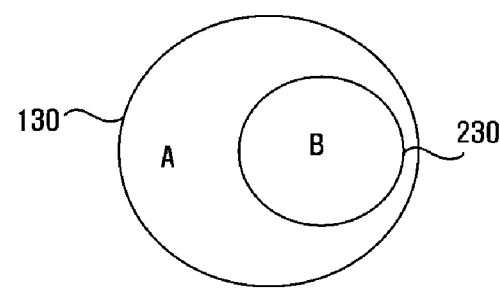
[Fig. 13]
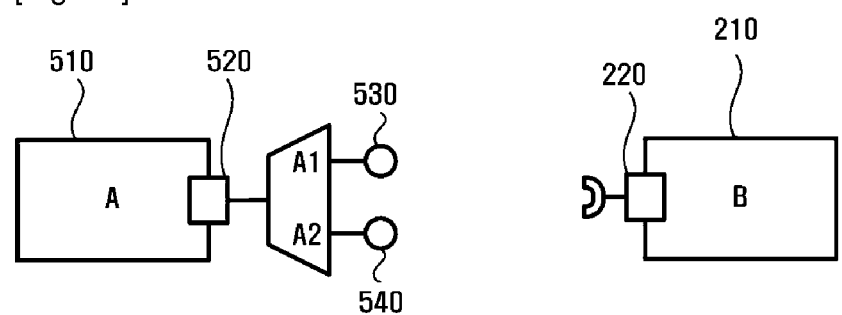
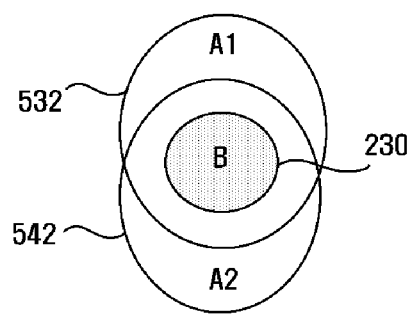

[Fig. 14]
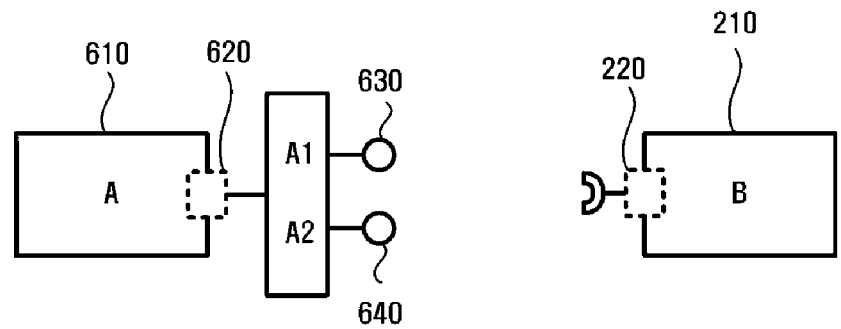
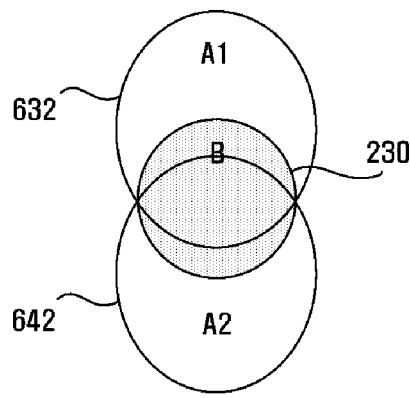
[Fig. 15]
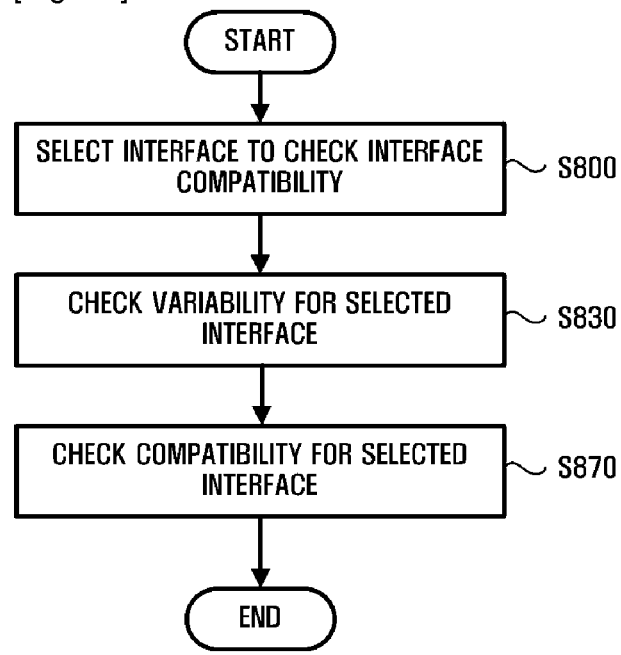

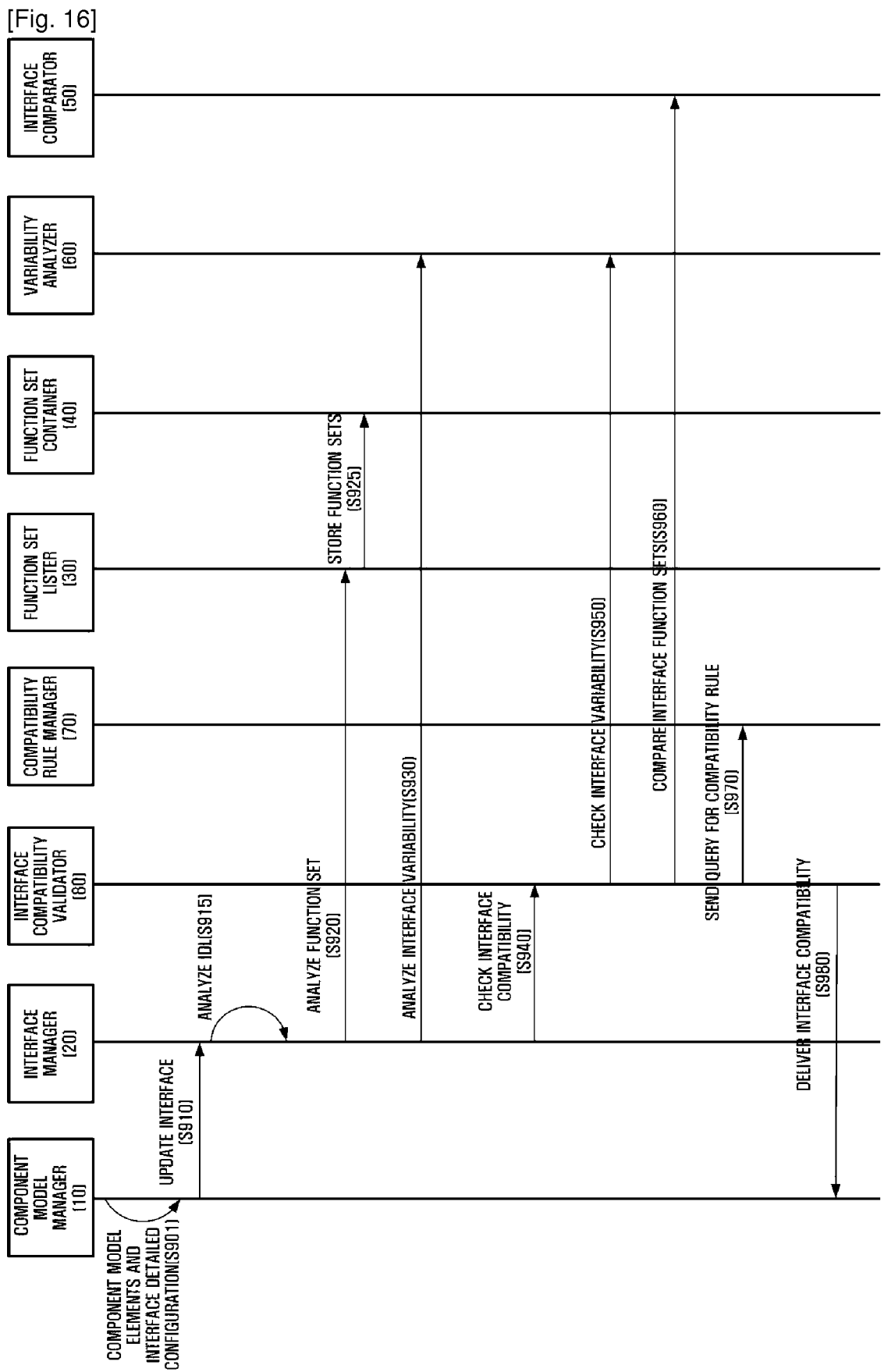
[Fig. 16]

[Fig. 17]
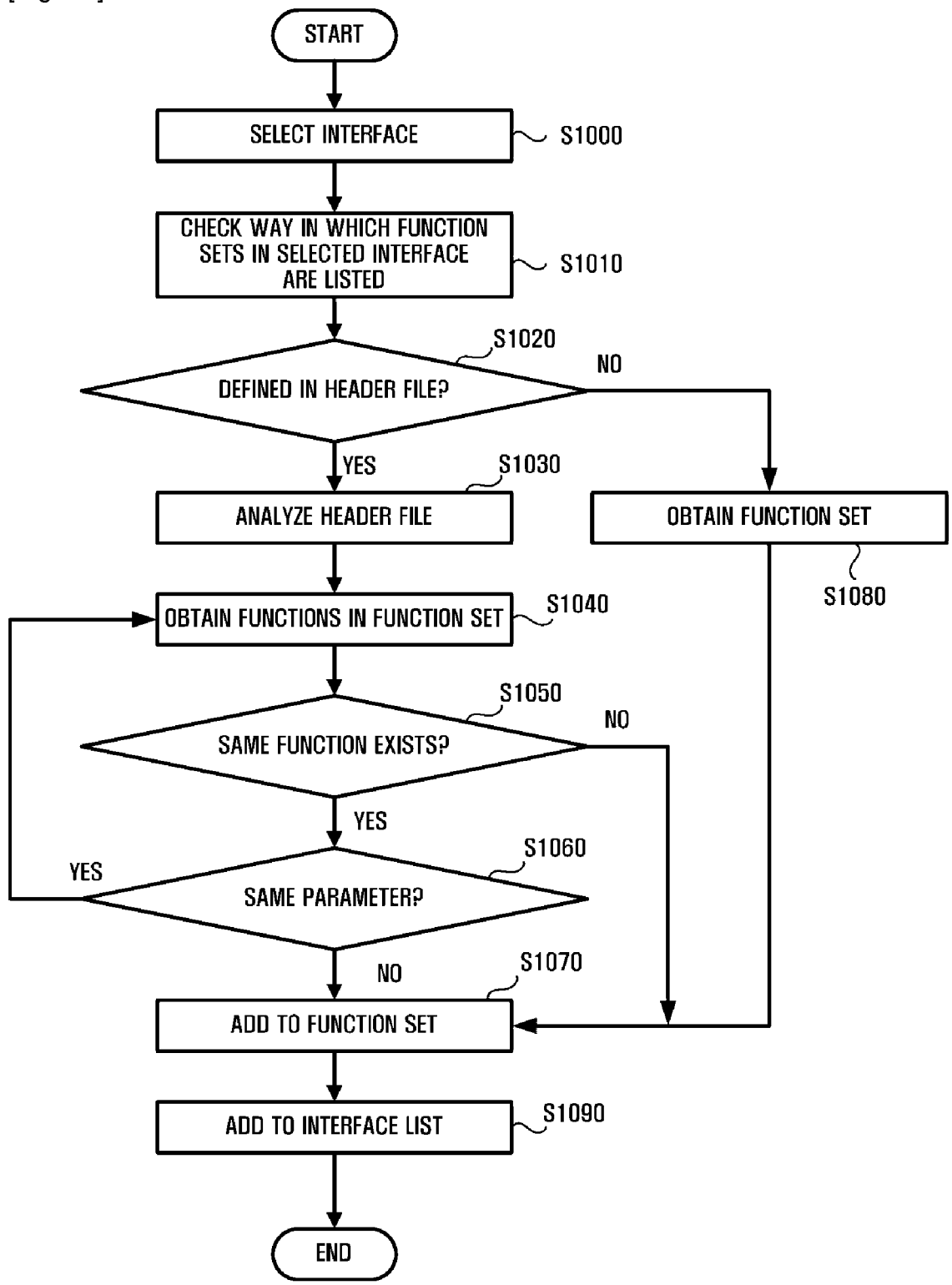

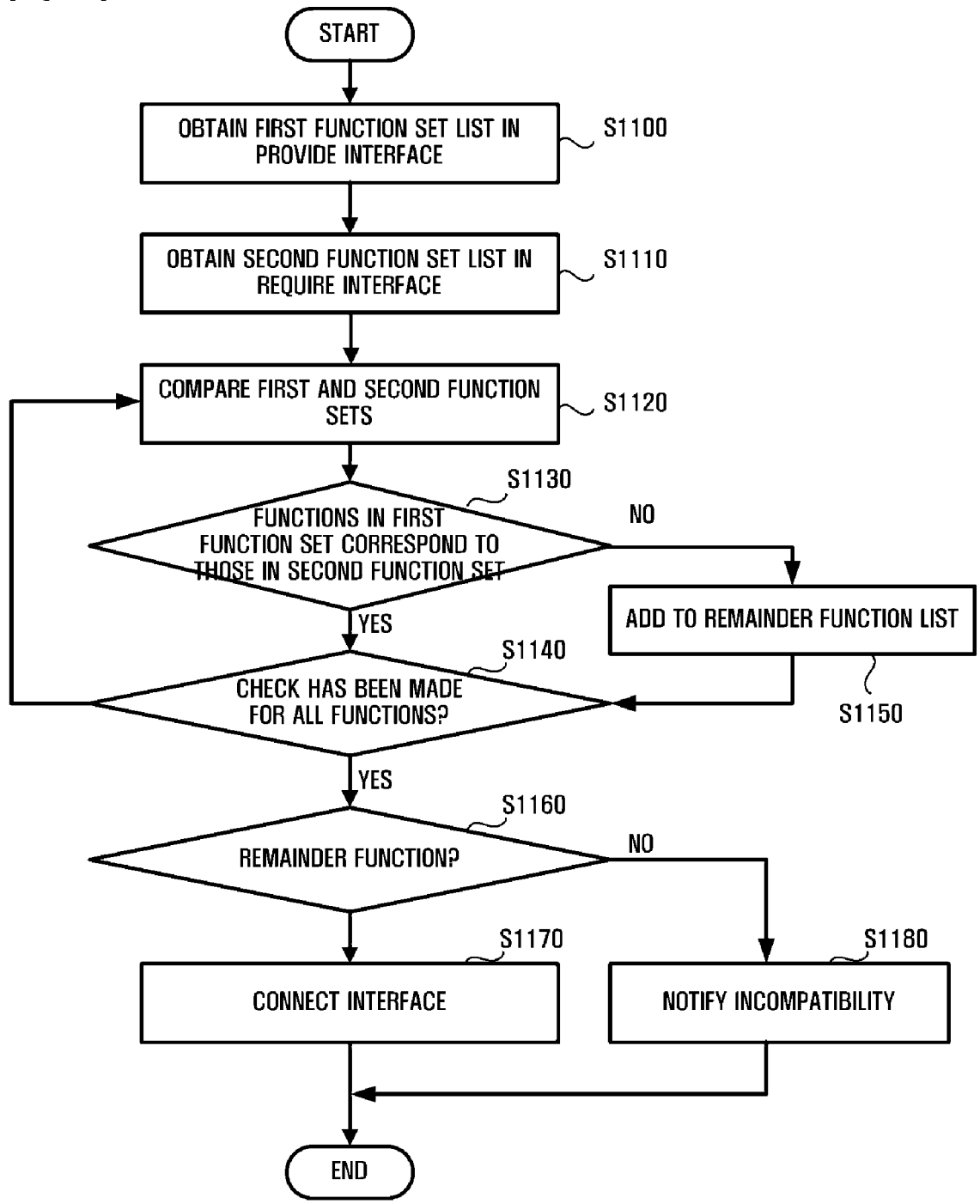
[Fig. 18]

[Fig. 19]
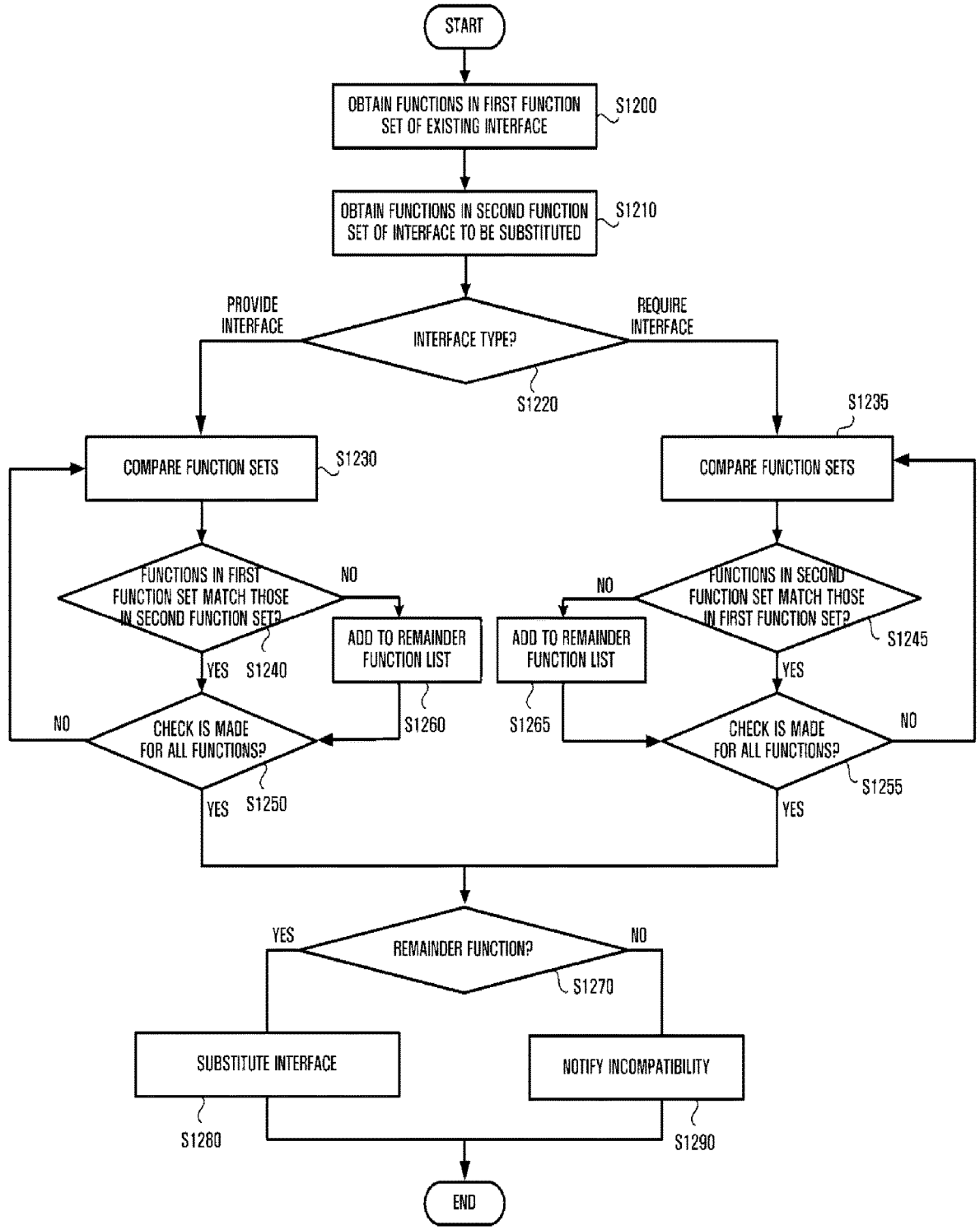

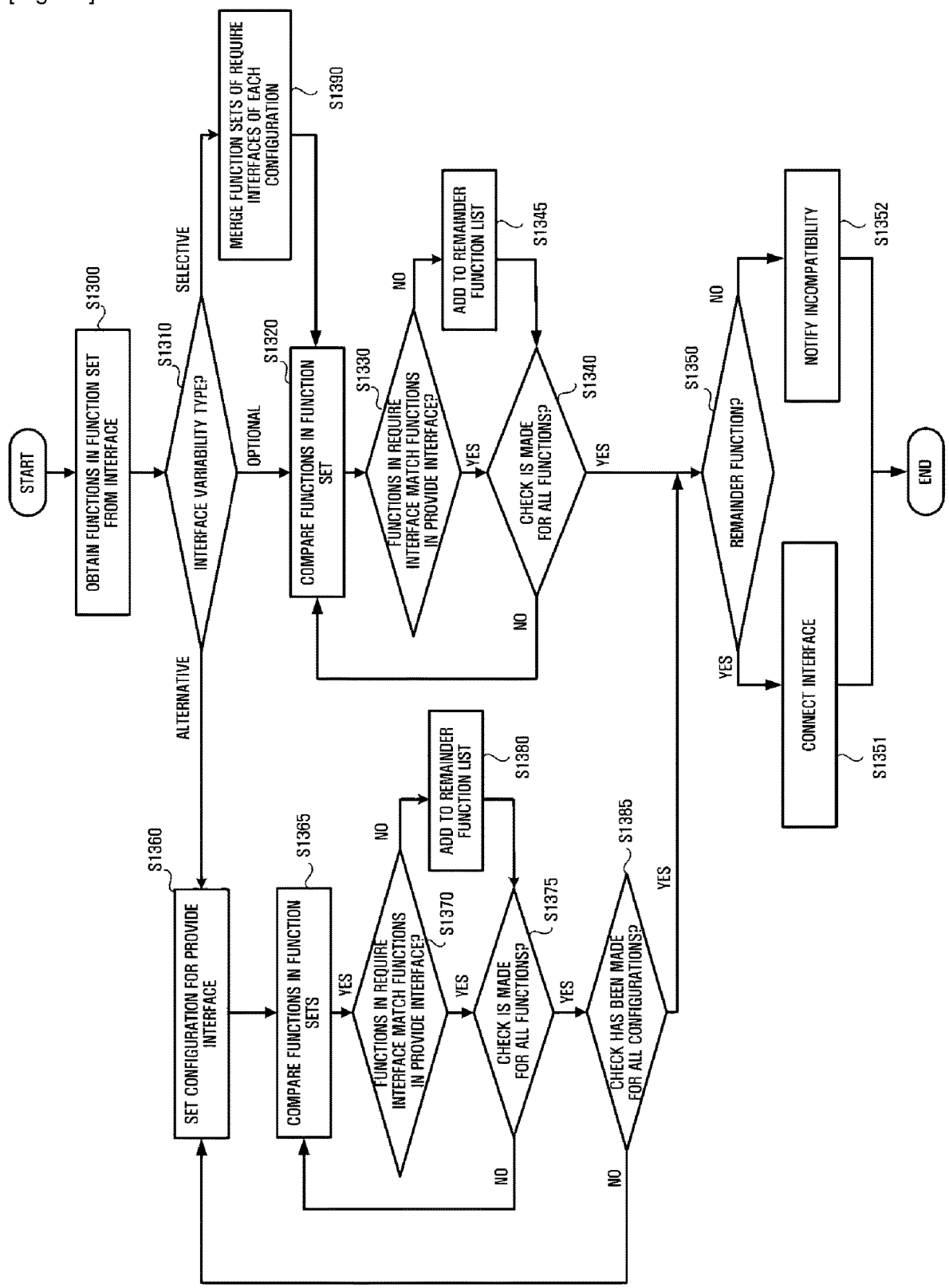
[Fig. 20]

[Fig. 21]
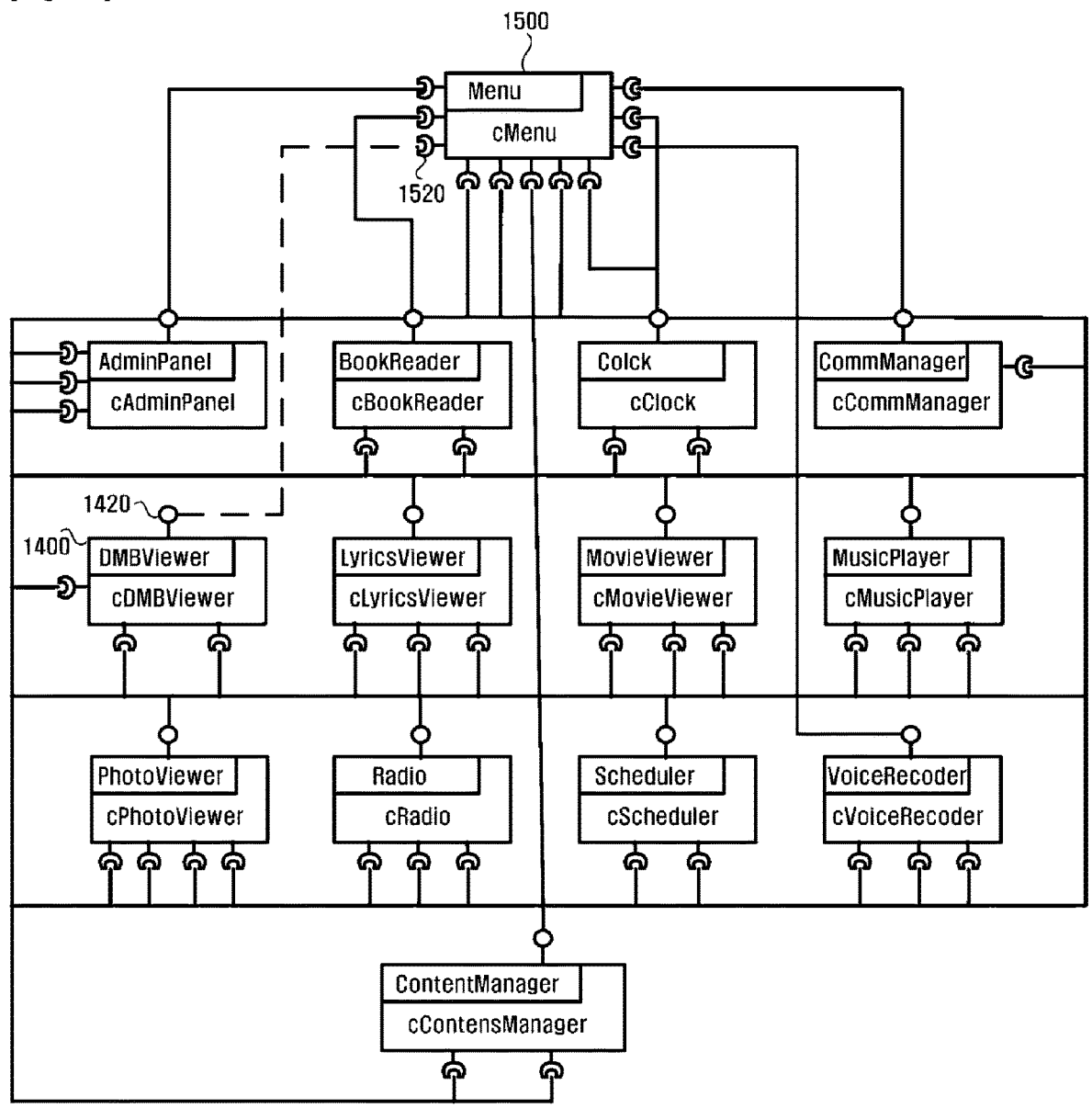

[Fig. 22]
DMBViewer_V1.h
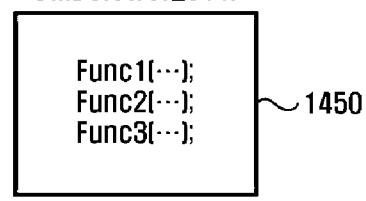
DMBViewer_V2.h
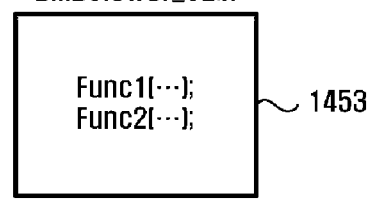
DMBViewer_V3.h
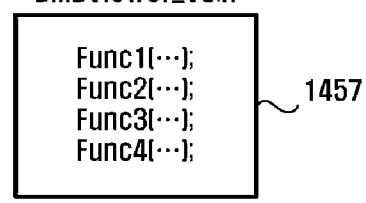

METHOD AND SYSTEM FOR DETERMINING INTERFACE COMPATIBILITY BASED ON COMPONENT MODEL

CROSS-REFERENCE TO RELATED APPLICATION(S)

This application is a continuation of International Application PCT/KR2008/001351, filed on Mar. 10, 2008, which claims the benefit of Korean Patent Application No. 10-2007-0098764, filed Oct. 1, 2007, in the Korean Intellectual Property Office, the entire disclosures of which are both incorporated herein by reference for all purposes.

BACKGROUND

1. Field

The following description relates to component based software, and, more particularly, to a method and system for determining interface compatibility between components.

2. Description of Related Art

A software product line operating system can support a quick, systematic development process by constructing system architecture from a combination of software components. An individual software component is a software package or module that encapsulates a set of related functions or data. The individual components communicate with each other through interfaces.

Component-based Software Engineering (CBSE) is an approach to software development that relies on component definition and interface combination of functional modules. In CBSE, a component model is a model that defines software components according to standards, and expresses the composition structure. CBSE uses a system for managing and composing components based on a component model.

Further, in developing software based on a component model, components should be composed so that they meet the functional requirements of the software product. That is, it must be verified that the functions of components match before composition.

In component-based software development (CBSD), the functions of each component may be specified by a set of functions having various configurations rather than a single function. As the number of components within a system increases, the system becomes more complex. Also, there is a significant increase in the amount of time and effort to manually verify whether components can be composed with each other and function correctly.

SUMMARY

In one general aspect, there is provided a system for determining interface compatibility in component model-based software design, the system including a compatibility rule manager for managing interface compatibility rules, and an interface compatibility validator for verifying interface compatibility between components, based on the interface compatibility rules.

The system may further include a variability analyzer for analyzing interface variability of an interface.

The interface compatibility may encompass interface connectivity corresponding to the capability to connect components, or interface substitutability corresponding to the capability to substitute a component.

The system may further include an interface applicator for connecting components or for replacing one component with another, based on the result of verifying the interface compatibility.

The system may further include a function set lister that describes a function set representing the functions of the interface.

The system may further include a function set containing managing information about the function set described in the function set lister, for each interface.

The interface may include a provide interface containing a function set defining functions being provided by a component and a require interface containing a function set corresponding to the function set in the provide interface.

The compatibility rule manager may provide a rule dictating that the provide interface and the require interface can connect to each other if the function set in the provide interface encompasses the function set in the require interface.

The compatibility rule manager may provide a rule dictating that if a function set in a future provide interface to be substituted encompasses a function set in the existing provide interface, the future provide interface can be substituted for the existing provide interface.

The compatibility rule manager may provide a rule dictating that if a function set in a require interface to be substituted is encompassed by a function set in the existing require interface, the require interface can be substituted for the existing require interface.

The interface variability may include at least one of optional variability, alternative variability, and selective variability.

The compatibility rule manager may provide a rule dictating that if the type of the interface variability is optional, provide and require interfaces can connect to each other if a function set in the provide interface encompasses a function set in the require interface.

The compatibility rule manager may provide a rule dictating that if the type of the interface variability is alternative, provide and require interfaces can connect to each other if each function set in the require interfaces is encompassed by a function set in the provide interface.

The compatibility rule manager may provides a rule dictating that if the type of the interface variability is selective, provide and require interfaces can connect to each other if the sum of function sets in selected require interfaces is encompassed by a function set in the provide interface.

In another aspect, there is provided a method for determining interface compatibility in component model-based software design, the method including applying interface variability to an interface for a component, and verifying interface compatibility between components using interface compatibility rules based on the type of interface variability.

The method may further include connecting components or replacing one component with another based on the result of verifying the interface compatibility.

The interface compatibility may encompass interface connectivity corresponding to the capability to connect components or interface substitutability corresponding to the capability to substitute a component.

The interface connectivity may be determined by verifying whether functions in a function set of a provide interface correspondingly match functions in a function set of a require interface.

If an interface to be substituted is a provide interface, interface substitutability may be determined by verifying whether functions in a function set in the existing interface are included in a function set of the interface to be substituted.

If an interface to be substituted is a require interface, interface substitutability may be determined by verifying whether functions in a function set of the interface to be substituted are included in a function set in the existing interface.

The interface variability may include at least one of optional variability, alternative variability, and selective variability.

Other features and aspects may be apparent from the following description, the drawings, and the claims.

BRIEF DESCRIPTION OF THE DRAWINGS

FIG. 1 is a diagram illustrating an example of a system for determining interface compatibility in component model-based software design.

FIG. 2 is a diagram illustrating an example of a component model.

FIG. 3 is a diagram illustrating an example of syntax for describing a list of function sets on an interface.

FIGS. 4 through 7 are diagrams illustrating examples of interface connectivity rules.

FIGS. 8 and 9 are diagrams illustrating examples of interface substitutability rules for a provide interface.

FIGS. 10 and 11 are diagrams illustrating examples of interface substitutability rules for a require interface.

FIGS. 12 through 14 are diagrams illustrating examples of interface compatibility rules considering interface variability.

FIG. 15 is a flowchart illustrating an example of a method for determining interface compatibility in component model-based software design.

FIG. 16 is a flowchart illustrating an example of a method for determining interface compatibility in component model-based software design.

FIG. 17 is a flowchart illustrating an example of a method for analyzing interface functions in a component model.

FIG. 18 is a flowchart illustrating an example of a method for determining interface connectivity.

FIG. 19 is a flowchart illustrating an example of a method for determining interface substitutability.

FIG. 20 is a flowchart illustrating an example of a method for determining the compatibility of an interface based on set variability.

FIG. 21 is a diagram illustrating an example of a software architecture for an MP3 player.

FIG. 22 is a diagram illustrating an example in which interface substitutability is applied to a digital multimedia broadcasting (DMB) viewer in the MP3 player shown in FIG. 21.

Throughout the drawings and the detailed description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

A method and system for determining interface compatibility based on a component model are described herein with reference to the accompanying drawings in which the configuration of the system and the steps of the method are shown.

As described herein, it should be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to create means for implementing the functions specified in the flowchart block or blocks.

In addition, each block may represent a module, a segment, or a portion of code, which may include one or more executable instructions for implementing the specified logical functions.

It should also be noted that in other implementations, the functions noted in the blocks may occur out of the order noted or in different configurations of hardware and software. For example, two blocks shown in succession may be executed substantially concurrently, or the blocks may be executed in reverse order, depending on the functionality involved.

FIG. 1 illustrates an example of a system for determining interface compatibility in component model-based software design.

Referring to FIG. 1, system 99 is an example of a system for determining interface compatibility in component model-based software design. The example system 99 includes a component model manager 10, an interface manager 20, a function set lister 30, a function set container 40, an interface comparator 50, a variability analyzer 60, a compatibility rule manager 70, an interface compatibility validator 80, and an interface applicator 90.

The component model manager 10 is a module responsible for managing the addition, change, and deployment of elements within a component model to compose software platform architecture information. The component model manager 10 performs definition of a component and an interface, formation of composite components, and variability management. Also, the component model manager 10 delivers all the changes made to the interface information to the interface manager 20.

When the component model manager 10 makes a change to the construction of a component model, a description syntax specifying the component model is synchronized with the change.

Meanwhile, when a software platform is constructed using a component model, construction information about the software platform is represented as a combination of components and configuration-variables that are elements of a Component Level Description (CLD).

The interface manager 20 is a module that manages information and change history of interface elements included in the component model. The interface manager 20 also analyzes the functionality of each interface from the description of the interface in an Interface Definition Language (IDL), and derives variability information that is set in the interface through a subordinate module.

The function set lister 30 receives a request to analyze the IDL description and lists function sets using header files. Function sets provided by an interface may be listed using a Symbol Description that is used to directly represent functions. Alternatively, in the case where implementation codes are available, header mapping may be used to describe a directory of header files that indicate interface functions. The header mapping may be used to extract only functions declared in header files, from a large number of existing codes, such as a legacy system, thus allowing efficient listing of a function set that defines the functions of interface.

The function set container 40 is a module that manages function sets, for example, function sets derived from header files in the function set lister 30 or directly written in an IDL separately for each interface.

The interface comparator 50 compares functions in the function sets with each other to verify interface compatibility. For example, the interface comparator 50 compares functions in the function sets using different criteria, based on the type or variability of interface. For example, the interface comparator 50 may determine interface comparability by comparing function sets in terms of interface connectivity or interface substitutability.

The variability analyzer 60 manages variability that is set in an interface among various variability factors that may be set in a component model. Interface variability should be considered in determining interface compatibility because variability affects comparability. For example, if variability is set in an interface, components may be connected with each other via compatible interfaces, but if the variability is removed, interface compatibility ceases to be preserved.

The variability analyzer 60 may provide an additional rule in analyzing interface compatibility by managing interface variability that can be added or changed in constructing a component model. The variability analyzer 60 also analyzes variability of an interface and delivers interface variability information to the compatibility rule manager 70.

The compatibility rule manager 70 provides rule information for determining interface compatibility. For example, the compatibility rule manager 70 provides rule information for determining interface compatibility with respect to interface connectivity or interface substitutability. Upon receiving a request to validate compatibility from interface compatibility validator 80, the compatibility rule manager 70 provides rule information for interface compatibility when the variability is set in an interface as well as rule information for interface compatibility with respect to interface connectivity or substitutability.

The interface compatibility validator 80 receives information about changes made to an interface within a component model from the interface manager 20 and validates interface compatibility. For example, the interface compatibility validator 80 receives information about interface variability to be analyzed from the variability analyzer 60 to verify whether interface variability has been set. In order to verify the functionality of each interface, the interface compatibility validator 80 also uses the interface comparator 50 to compare function sets of interfaces to be analyzed with one another. Based on the result of the comparison between the functionalities of interfaces and interface variability information, the interface compatibility validator 80 determines interface compatibility with respect to interface connectivity or substitutability managed by the compatibility rule manager 70.

The interface applicator 90 performs connection and substitution between compatible interfaces, based on the result of validation from the interface compatibility validator 80. If the interfaces are not compatible with each other, the interface applicator 90 notifies a user or system that the interfaces cannot connect or be substituted between components, and ceases to connect and substitute the interfaces.

FIG. 2 illustrates an example of a component model. Referring to FIG. 2, the component model includes a first component unit 100 consisting of a component 110 and an interface 120, a second component unit 200 consisting of a component 210 and an interface 220, and a connection 150 between the first component unit 100 and the second component unit 200.

In this example, the components 110 and 210 correspond to logical modules or subsystems. The component unit 100 connects with the other component unit 200 via the connection 150. For example, if the component model is applied to an MP3 player, software supporting the MP3 player may be designed and developed based on various components, for example, a music execution component, a clock component, an audio-recording component, a radio component, and the like. In this example, component 110 corresponds to a 'provide component' that provides a specific function through the provide interface 120. The component 210 corresponds to a 'require component' that makes a request to the provide component 110 through the require interface 220. Based on the request, the require component 210 may request for a specific function to be provided by the provide component 110 to the require component 210

Each of the interfaces 120 and 220 contains a specific function set and performs functionality specified by functions in the function set. The interface 120 corresponds to the provide interface that provides a specific function to other components. The interface 220 corresponds to the require interface that receives a function from another component for use.

The connection 150 is an element representing co-dependency between the provide interface 120 and the require interface 220. The connection 150 may be made depending on the interface compatibility between the provide interface 120 and the require interface 220.

Variability factors may be applied to the component units 100 and 200. Variability factors are used to provide configuration requirements to the component 110, the interface 120, and the connection 150. The interface variability may be used as a variability factor In a component description language (CDL) used to describe a component model, a variability factor may be represented by configuration variables. By combining configuration variables with an element to be applied, software architecture design information encompasses specifications for internal variability.

In some embodiments, interface variability is applied by assigning variability factors to an interface in a component unit. Interface variability types may be categorized, for example, into an 'Optional' category, an 'Alternative' category, and 'Selective', as follows.

(1) If the interference variability type is 'Optional', a determination is made whether to select an interface according to a condition. The selection or non-selection of the interface may be represented by bit value of 1 or 0. For example, '1' and '0' may respectively represent selection ('On' state) and non-selection ('Off' state) of an interface. The on/off operation of an interface may be associated with an on/off operation of a component providing the interface. Thus, component variability may be affected by interface variability.

(2) If the interference variability type is 'Alternative', one interface is selected from a plurality of related interfaces. An example representation of 'Alternative' is one and only one (1 . . . 1).

(3) If the interference variability type is 'Selective', zero interfaces or at least one of a plurality of interfaces may be selected. An example representation of 'Selective' is zero or more (0 . . . *). In this case, no interface, one interface, or a plurality of interfaces may be selected.

As described above, interface variability conforms to compatibility rules that are described later. Thus, the system and method described herein may analyze and determine interconnection and compatibility between component units according to interface variability and compatibility rules.

FIG. 3 illustrates an example of syntax for describing a list of function sets of an interface.

In this example, interfaces are classified into provide interfaces containing function items provided by components and require interfaces containing function items requested by other components and represent interactions between components. Function items provided by a component are referred to as a 'function set'.

For example, information about a function set containing function items of an interface may be represented in the IDL language. Referring to FIG. 3, the IDL may support multiple types of syntax, for example, symbol description and header mapping.

Symbol description may be used to describe functions in a function set contained in an interface.

Header mapping may be used to designate a directory of header files at a specific location and analyze function sets declared in the designated header files. This form of description is useful for extracting a component model from a legacy software system. The header mapping may also be used to designate the location of header files that will be generated while creating actual implementation codes during construction of a component model.

In some embodiments, interface compatibility may be considered. Interface compatibility refers to the capability to connect interfaces of components or replace one interface with another for connection or substitution between components, in component model-based software architecture design. Thus, it is necessary to maintain interface compatibility between components during component model-based software architecture design However, because the number of interfaces and lists of function sets describing the functions of each interface increases with software size and the number of components, it is not easy to manually verify interface compatibility between components. Further, due to frequent changes in software design and components, interface compatibility may be broken between components that have maintained interface compatibility.

Accordingly, the system and method described herein, may automatically connect interfaces with each other according to interface compatibility rules.

In determining interface compatibility, the following aspects may be taken into consideration. First, interface connectivity corresponds to the capability to connect provide components and require components. Second, interface substitutability corresponds to the capability to replace one interface with another, for example, substituting an existing provide component with a another provide component.

In a component model, components are interconnected by connection between provide interface and require interface. In order to connect between interfaces, compatibility rules needs to be met. That is, compatibility between interfaces must be satisfied according to the compatibility rules for interconnection between interfaces.

FIGS. 4 through 7 illustrate examples of interface connectivity rules. Referring to FIG. 4, if a function set 130 in a provide interface 120 encompasses a function set 230 in a require interface 220, the provide interface and the require interface 120 and 220 are compatible with each other because functions requested by the require interface 220 may be provided by the function set 130 contained in the provide interface 120.

Referring to FIG. 5, if a function set 130 in a provide interface 120 coincides with only a part of a function set 230 in a require interface 220, the provide and require interfaces 130 and 230 are incompatible with each other because some of the functions requested by the require interface 220 cannot be provided by the function set 130 contained in the provide interface 120.

Referring to FIG. 6, provide and require interfaces 120 and 220 are incompatible with each other because a function set 130 in the provide interface 120 does not coincide with a function set 230 in the require interface 220.

Referring to FIG. 7, if a function set 130 in a provide interface 120 is smaller than a function set 230 in a require interface 220, the provide interface and the require interface 120 and 220 are incompatible with each other because some of the functions requested by the require interface 220 cannot be provided by the provide interface 120.

As described above, the provide and require interfaces 120 and 220 are compatible with each other if the function set 130 in the provide interface 120 encompasses the function set 230 in the require interface 220 as illustrated in FIG. 4.

FIGS. 8 and 9 illustrate examples of interface substitutability rules for a provide interface.

Referring to FIG. 8, if a function set 130 in a provide interface 120 of component A is encompassed by a function set 330 in a provide interface 320 of component C to be substituted, the provide interfaces 120 and 320 are compatible with each other in terms of interface substitutability. Thus, the provide interface 320 may be substituted for the provide interface 120. In this example, because the function set 330 is larger than the function set 130, the component C may provide more functions than provided by the existing component A to a require interface.

Referring to FIG. 9, if a function set 130 in a provide interface 120 of component A coincides with none or a part of a function set 330 in a provide interface 320 of component C to be substituted, the provide interfaces 120 and 320 are incompatible with each other in terms of interface substitutability. In this example, the provide interface 320 cannot be substituted for the provide interface 120.

As described above, the provide interfaces 120 and 130 are compatible with each other in terms of interface substitutability if the function set 330 in the provide interface 320 of component C to be substituted encompasses the function set 130 in the provide interface 120 of existing component A.

FIGS. 10 and 11 illustrate examples of interface substitutability rules of a require interface.

Referring to FIG. 10, if a function set 230 in a require interface 320 of component B is encompassed by a function set 430 in a require interface 420 of component D to be substituted, the require interfaces 320 and 420 are compatible with each other. Thus, the require interface 420 may be substituted for the require interface 320. In this example, because the function set 430 is encompassed by the function set 230, functions requested by the require component D are within the function set 230 in the require interface 320 of the existing component B.

Referring to FIG. 11, if a function set 230 in a require interface 320 of component B coincides with none or a part of a function set 430 in a require interface 420 of component D to be substituted, the require interfaces 320 and 420 are incompatible with each other in terms of interface substitutability.

In replacing a require component as described above, interfaces are compatible with each other in terms of interface substitutability if the function set 430 in the require interface 420 of component D to be substituted is encompassed by the function set 230 in the require interface 320 of existing component B.

As described above, in some embodiment, variability factors, for example, 'Optional', 'Alternative', and 'Selective' may be introduced into interface compatibility. In this example, interface compatibility rules may further include compatibility rules considering variability.

FIGS. 12 through 14 illustrate examples of interface compatibility rules considering interface variability.

Referring to the example shown in FIG. 12, if the variability factor 'Optional' is applied in a request or provide interface, 'optional' may have a value of '0' or '1' according to configuration variables. Thus, in order to maintain interface compatibility if 'optional' has a value of 1, a function set 130 in a provide surface 120 encompass a function set 230 in a require interface 220.

FIG. 13 illustrates interface compatibility rules when the variability factor 'Alternative' is applied in a provide interface. Referring to FIG. 13, a provide interface 520 includes interfaces A1 530 and A2 540. Because 'Alternative' means one of a plurality of interfaces has to be chosen, interface compatibility should be maintained between one of the interfaces A1 530 and A2 540 and require interface 220. Thus, to maintain interface compatibility if 'Alternative' is applied, both of the functions sets 532 and 542 in the interfaces A1 530 and A2 540 must be encompassed by a function set 230 in the require interface 220.

Conversely, if 'Alternative' is applied in a require interface, a function set in a provide interface should encompass both of the function sets in the require interfaces to preserve interface compatibility.

FIG. 14 illustrates interface compatibility rules when the variability factor 'Selective' is applied in a provide interface. Referring to FIG. 14, a provide interface 620 includes interfaces A1 630 and A2 640. If 'Selective' is applied, none or at least one of a plurality of interfaces may be selected.

Thus, if one of a plurality of interfaces is selected, only a function set in the selected interface must satisfy interface compatibility rules. If two of the plurality of interfaces are selected, the sum of function sets in the two selected interfaces must meet interface compatibility rules.

To maintain interface compatibility if 'Selective' is employed, the sum of function sets 632 and 642 in the selected provide interfaces A1 630 and A2 640 must encompass the function set 230 in a require interface 220.

Conversely, if 'Selective' is applied in a require interface, i.e., require interfaces are selected, the sum of function sets in the selected require interfaces must be smaller than or coincide with a function set in a provide interface to meet interface compatibility rules.

As described above, interface variability may be introduced into a component model to extend interface compatibility rules. By applying the above interface compatibility rules, efficient connection/substitution between components may be made even when interface variability is employed.

FIG. 15 illustrates an example of a method for determining interface compatibility in component model-based software design.

Referring to FIG. 15, in 800, an interface is selected to verify interface compatibility. Upon replacement of a component or change in the location and details of a component, an interface may be selected to verify interface compatibility.

After selecting the interface, in 830, the variability type of the selected interface is verified. The variability type may be one of 'optional', 'alternative' and 'selective'.

In 870, interface compatibility is verified for the interface whose variability type has been identified. Interface compatibility rules are applied according to the type of interface variability or interface to verify interface compatibility between components.

If interface compatibility exists between components, interfaces for the components may be connected with each other or may be substituted with another interface. Conversely, if interface compatibility does not exist, a user or system is notified of the incompatibility.

FIG. 16 illustrates an example of a method for determining interface compatibility in component model-based software design.

Referring to FIG. 16, in 901, a component model manager 10 manages changes on the configurations for components based on a component mode. When a change in an interface occurs, in 910, the component model manager 10 delivers the change to an interface manager 20. The interface manager 20 then starts a process for verifying interface compatibility on the updated interface in 910.

To perform the process, in 915, the interface manager 20 first analyzes the IDL that describes the functions of an interface. If the IDL description is represented by a directory of header files, in 920, the interface manager 20 extracts a list of function sets from a function set lister 30. In 925, information about individual function sets, in an interface, is stored in a function set container 40.

In 930, the interface manager 20 controls a variability analyzer 60 to analyze variability information about whether variability is set in an interface.

After extracting the function set in an interface and verifying the interface variability, in 940, the interface manager 20 calls an interface compatibility validator 80. In 950, 960, and 970, the interface capability validator 80 sequentially calls a variability analyzer 60, an interface comparator 50, and a compatibility rule manager 70, respectively, for setting variability between interfaces and comparison of functions sets therebetween.

For example, in 950, the variability analyzer 60 may provide variability information about an interface to the interface compatibility validator 80. In 960, the interface comparator 50 compares function sets in interfaces with each other and delivers the resulting interface compatibility information to the interface compatibility validator 80. In 970, the compatibility rule manager 70 may provide interface compatibility rules for determining interface compatibility between interfaces to the interface compatibility validator 80.

The interface compatibility validator 80 determines interface compatibility and notifies the component model manager 10 in 980. If the interfaces are incompatible with each other, the interface compatibility validator 80 notifies the component model manager 10 that an interface connection within a component model is not appropriate.

FIG. 17 illustrates an example of a method for analyzing functions of each interface in a component model.

Referring to FIG. 17, in 1000, an interface is selected for analysis. In 1010, an IDL syntax is analyzed for the selected interface to verify the way in which a function set describing the functions of the interface is listed. For example, whether the functions of an interface defined in IDL files are listed may be verified using symbol description or header mapping.

If a function set is listed using header mapping, in 1030, each header file is analyzed, and functions are extracted in 1040. In 1050, whether the same functions exist upon extracting the functions is verified. In 1060, if the same functions exist, it is verified whether they have the same parameter. If the functions have different parameters, they are considered to be different functions, and in 1070, they are added to the function set. However, if the functions have the same parameter, they are not added to the function set because they are considered substantially the same.

Conversely, if a function set is listed using a symbol description that is used to directly represent functions, in 1020 and 1080, the functions are extracted without analyzing them.

After listing functions in the function set, in 1090, function set information for an interface is added to data containing function set information for each interface.

FIG. 18 illustrates an example of a method for determining interface connectivity.

Referring to FIG. 18, in 1100, first function set information for a provide interface is verified, and in 1110, second function set information for a require interface is verified. In 1120, the first and second function sets are compared with each other. For comparison, in 1130, it is verified whether functions in the first function set of the provide interface correspond to functions in the second function set of the require interface.

If a function corresponding to a function requested by the require interface does not exist within the first function set of the provide interface, in 1150, the function is added to a remainder function list. Thus, if a remainder function exists, which means a function requested by the require interface cannot be provided by the provide interface, the provide and require interfaces are 'incompatible'.

In 1140, whether the steps 1120, 1130, and 1150 have been performed on all functions in the first function set is verified. In 1160, whether a remainder function exists is verified. If a remainder function does not exist, which means the first function set in the provide interface encompasses the second function set in the require interface, the provide and require interfaces are compatible so they connect to each other in 1170.

Conversely, if a remainder function exists in 1160, the provide and require interfaces are incompatible with each other because they do not satisfy interface compatibility rules with respect to interface connectivity. Thus, a user or system is notified that the interfaces are incompatible with each other in 1180.

As described above, the method and system described herein allow automatic determination of interface compatibility between components in a component-based software platform architecture design, thus providing accuracy and reliability in a large-scale software platform architecture design.

FIG. 19 illustrates an example for determining interface substitutability. The method may be included in the method for determining interface compatibility in component model-based software design illustrated in FIG. 18.

Referring to FIG. 19, in 1200 a first function set in an existing interface is obtained, and in 1210, a second function set in an interface to be substituted is obtained. Whether the type of the interface to be substituted is a require interface is verified in 1220.

If the interface to be substituted is a provide interface, it is then verified whether functions in the first function set in the existing interface are included in the second function set of the interface to be substituted.

For example, the first function set is compared with the second function set in 1230. In 1240, it is verified whether functions in the first function set of the existing interface correspondingly match the functions in the second function set of the interface to be substituted. If all the functions in the first function set correspondingly match the functions in the second function set, the provide interface can be substituted for the existing provide interface. However, if a function not matching a function in the second function set exists in the first function set, the non-matching function is added to a remainder function list in 1260.

If in 1270, it is determined that a remainder function list exists, which means the second function set in the provide interface to be substituted does not include the first function set in the existing provide interface, a user or system is notified that the interfaces are incompatible with each other in 1290. Conversely, if in 1270, it is determined that a remainder function list does not exist, which means the second function set includes the first function set, the new provide interface is substituted for the existing provide interface in 1280.

If the interface to be substituted is a require interface, it is then verified whether functions in the second function set of the interface to be substituted are included in the first function set of the existing interface.

For example, in 1235, functions in the first function set are compared with functions in the second function set. In 1245, it is verified whether functions in the first function set of the existing interface correspondingly match the functions in the second function set of the interface to be substituted. If all the functions in the first function set correspond to the functions in the second function set, the require interface can be substituted for the existing provide interface. However, if a function not matching a function in the second function set exists in the first function set, the non-matching function is added to a remainder function list in 1265.

If in 1270 it is determined that a remainder function does not exist, which means the second function set is smaller than or coincides with the first function set, the new require interface is substituted for the existing require interface in 1280.

If the remainder function exists in 1270, which means the second function set is larger than the first function set, in 1290 the require interfaces are determined to be incompatible with each other and the new require interface cannot be substituted for the existing require interface.

As described in the foregoing, rules for interface connectivity as well as rules for interface substitutability may be automatically applied in determining interface compatibility. The rules may also be applied in upgrading component model-based software or updating the software platform.

FIG. 20 illustrates an example of a method for determining the compatibility of an interface based on set variability.

Referring to FIG. 20, in 1300, functions in a function set are obtained from an interface whose compatibility with another interface will be determined. In determining interface connectivity, function sets in provide and require interfaces may be called first and second function sets, respectively.

The interface variability type is verified in 1310. For example, the interface variability type may be one of 'optional', 'alternative', and 'selective'.

If the interface variability type is 'optional', interface compatibility is verified for a provide interface. To achieve this, in 1320, functions in the first function set of the provide interface are compared with functions in the second function set of the require interface. For comparison, in 1330, it is verified whether functions in the second function set of the require interface correspond to functions in the first function set of the provide interface. If a function corresponding to a function requested by the require interface does not exist within the first function set of the provide interface, in 1345, the function is added to a remainder function list. After performing 1320, 1330, and 1345 on all functions in the second function set, interface compatibility is determined according to the presence of a remainder function.

If a remainder function does not exist, which means the first function set in the provide interface encompasses the second function set in the require interface, in 1350, the provide and require interfaces are determined to be compatible, and in 1351, the two interfaces are connected to each other. Conversely, if a remainder function exists, which means a function requested by the second function set in the require interface cannot be provided by the first function set in the provide interface, in 1350, the provide and require interfaces are determined to be 'incompatible' with each other. Thus, the user or system is notified of the incompatibility in 1352.

If the interface variability type is 'alternative', interface compatibility is verified for each configuration. Because 'alternative' means one of a plurality of interfaces has to be selected, in 1360, compatibility is verified for each interface being selected.

It is assumed that interface variability type is 'alternative' and one of a plurality of provide interfaces is selected. If one interface is selected, a function set in the selected provide interface is called a first function set. A function set in a require interface is called a second function set.

In order to verify interface compatibility, in 1365, functions in the first function set of the provide interface are compared with functions in the second function set of the require interface. For comparison, in 1370, it is verified whether functions in the second function set of the require interface correspond to functions in the first function set of the provide interface. If a function corresponding to a function requested by the require interface does not exist within the first function set of the provide interface, in 1380, the function is added to a remainder function list. The steps 1365, 1370, and 1380 are performed on all functions in the second function set.

If interface variability type is 'alternative' and another of the plurality of provide interfaces is selected, the above process is repeated in the same manner. That is, the above process is performed for each configuration in which each of the plurality of interfaces is selected in order to verify interface compatibility. In 1385, it is verified whether the above process is performed for all configurations.

If the interface variability type is 'alternative' and the interface compatibility has been verified for all configurations, in 1350, compatibility is determined according to the presence of a remainder function. If a remainder function does not exist, the provide and require interfaces are compatible, and in 1351 they are connected to each other. Conversely, if a remainder function exists, the provide and require interfaces are 'incompatible' with each other. Thus, in 1352, the user or system is notified of the incompatibility and the process is terminated.

If the interface variability type is 'selective', any number of interfaces may be selected for each configuration. Thus, if one or more interfaces are selected for each configuration, in 1390, function sets in the selected provide interfaces are merged. Interface compatibility is verified using merged function sets. It is assumed that the merged function set and a function set in a requested interface are called first and second functions sets, respectively.

As in the case interface variability type is 'optional', in 1320, functions in the first function set are compared with functions in the second function set. For comparison, in 1330, it is verified whether functions in the second function set correspondingly match functions in the first function set. If a function not matching a function in the first function set exists within the second function set, in 1345, the function is added to a remainder function list.

In 1350, it is verified whether a remainder function list exists. If the remainder function list does not exist, in 1351, the interfaces of 'selective' variability type are determined to be compatible and they may be connected to each other. If a remainder function list exists, in 1352, the user or system is notified of the incompatibility and the process is terminated.

As described above, a system and method for automatically determining interface compatibility even when interface variability is employed, are provided. Thus, under the circumstances that component configuration becomes more complicated and are subjected to variability in designing a software platform architecture based on a component model, automatic connection or substitution between interfaces is performed by automatically determining interface compatibility.

FIG. 21 illustrates an example of a software architecture for an MP3 player, and FIG. 22 illustrates an example in which interface substitutability is applied to a digital multimedia broadcasting (DMB) viewer in the MP3 player shown in FIG. 21.

FIG. 21 illustrates a component model-based software platform architecture design for an MP3 player consisting of components and interfaces being automatically interconnected according to interface compatibility. An interface may connect or be substituted between components according to interface compatibility rules.

Referring to FIG. 21, in this example, DMBViewer 1400 is a component designed to enable viewing of Digital Multimedia Broadcasting (DMB) on an MP3 player. Interface substitutability, that is, the capability to replace a provide interface 1420 of the DMB Viewer 1400 will now be examined. The provide interface 1420 connects with a require interface 1520 of a Menu component 1500 managing menu for the MP3 player.

Referring to FIG. 22, the existing interface for the DMBViewer 1400 contains functions defined in an example header file, DMBViewer_V1.*h* 1450.

In this example, it is assumed that an interface for the DMBViewer 1400 to be substituted contains header files DMBViewer_V2.*h* 1453 and DMBViewer_V3.*h* 1457. Interface substitutability rules dictate that a function set in a provide interface to be substituted must encompass a function set in the existing interface. Referring to FIG. 22, the header file DMBViewer_V2.*h* 1453 declares two functions Func1( ) and Func2( ) and the header file DMBViewer_V3.*h* 1457 declares four functions Func1( ), Func2( ), Func3( ), and Func4( ).

Because the header file DMBViewer_V1.*h* 1450 of the existing interface has three functions Func1( ), Func2( ) and Func3( ), the interface for the DMBViewer 1400 with the header file DMBViewer_V3.*h* declaring the four functions may be substituted for the existing interface according to the interface substitutability rules. Accordingly, efficient software platform architecture design may be provided by automatically determining interface connectivity or substitutability according to interface compatibility rules.

Described herein is a method and system for a component model-based software design. The method and system analyzes interface compatibility between components and determines whether to automatically connect interfaces or replace one interface with another based on the analysis result.

The method and system may automatically determine the interface compatibility when interface variability is employed, thus enabling quick, reliable component model-based software design.

Based on the above-described system and method, components may be reliably interconnected in designing software based on a component model by analyzing interface compatibility between components.

A component model may also be stably applied to a complicated system with a large number of software components. Components may be reliably interconnected by verifying interface compatibility between the components even when interface variability is employed.

The above-described system and method also provide interface compatibility rules for determining interface connectivity and component substitutability, thereby achieving consistent updating or evolution in component model-based software design and development.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to determine interface compatibility in component model-based software design, the apparatus comprising:
a processor configured to:
update a software platform comprising a first interface and a second interface;
provide a function set for the first interface;
provide a function set for the second interface;
provide interface compatibility rules comprising interface connectivity, based on a capability to connect components, or interface substitutability, based on a capability to substitute a component;
verify, based on the interface compatibility rules, existence of each function in the function set for the second interface in the function set for the first interface, wherein the interface compatibility rules comprise
(1) determining whether to select an interface according to an on state or off state of the interface for an optional variability type,
(2) determining whether to select one interface from a plurality of related interfaces for an alternative variability type, and
(3) determining whether to select any one or any two or more of interfaces for a selective variability type;
add functions in the function set for the second interface that do not exist in the function set for the first interface to a remainder function list based on a result of the verify; and
upon a determination that a function exists in the remainder function list, submit a notification of incompatibility; and
automatically apply rules for interface connectivity and rules for interface substitutability in determining interface compatibility,
wherein the optional variability type selects an interface according to an on state or off state of the interface, the alternative variability type selects one interface from a plurality of related interfaces, and the selective variability type selects any two or more of interfaces for a selective variability type.

2. The apparatus of claim 1, wherein the processor is further configured to connect the first interface and the second interface based on a determination that no function exists in the remainder function list and the compatibility rule.

3. The apparatus of claim 1, wherein the processor is further configured to describe the function set of the first interface and the function set of the second interface based on an Interface Definition Language (IDL) or a header.

4. The apparatus of claim 1, wherein the function set of the first interface defines functions being provided by a component, and the function set of the second interface defining functions being required by a component.

5. The apparatus of claim 1, wherein the compatibility rules dictate the compatibility or the substitutability of the first interface.

6. The apparatus of claim 4, wherein the first interface is a provide interface and the second interface is a require interface, and
wherein the processor is further configured to implement a rule dictating that a future provide interface is capable of being substituted for the provide interface, based upon a determination that a function set in the future provide interface includes each function in the function set in the provide interface.

7. The apparatus of claim 4, wherein the first interface is a provide interface and the second interface is a require interface, and
wherein the processor is further configured to implement a rule dictating that a future require interface can be substituted for the require interface, based upon a determination that a function set for the require interface includes each function in the function set of the future require interface.

8. The apparatus of claim 1, wherein the interface compatibility rules comprise the alternative variability type for the second interface and the second interface further comprises a function set of an alternative second interface,
wherein the verifying further comprises verifying that each function in the function set for the first alternative interface exists in the function set for the second interface, and
adding functions in the function set for the first alternative interface that do not exist in the function set for the second interface to the remainder function list.

9. The apparatus of claim 1,
wherein the interface compatibility rules comprise the optional variability type for the second interface and the second interface further comprises a function set of an optional second interface.

10. The apparatus of claim 1,
wherein the interface compatibility rules comprise the selective variability type for the second interface and the second interface further comprises a function set of an additional second interface,
wherein the verifying further comprises merging the function set of the additional second interface with the function set of the second interface.

11. A method for determining interface compatibility in component model-based software design, the method comprising:
parsing a function set for a first interface of a first component;
parsing a function set for a second interface of a second component;
applying interface variability to an interface for a component;
verifying, based on interface compatibility rules, existence of each function in the function set for the second interface in the function set for the first interface, wherein the interface compatibility rules comprise
(1) determining whether to select an interface according to an on state or off state of the interface for an optional variability type,
(2) determining whether to select one interface from a plurality of related interfaces for an alternative variability type, and
(3) determining whether to select any one or any two or more of interfaces for a selective variability type;
adding functions in the function set for the second interface that do not exist in the function set for the first interface to a remainder function list based on a result of the verify; and
upon a determination that a function exists in the remainder function list, submitting a notification of incompatibility,
wherein the parsing, applying, and verifying are performed by one or more processing devices to automatically determine the interface compatibility of the first interface and the second interface, and
wherein the optional variability type selects an interface according to an on state or off state of the interface, the alternative variability type selects one interface from a plurality of related interfaces, and the selective variability type selects any two or more of interfaces for a selective variability type.

12. The method of claim 11, further comprising connecting components or replacing one component with another based on the result of the one or more processing devices.

13. The method of claim 11, wherein the interface compatibility encompasses interface connectivity corresponding to the capability to connect components or interface substitutability corresponding to the capability to substitute a component.

14. The method of claim 13, wherein if an interface to be substituted is a provide interface, interface substitutability is determined by verifying whether functions in a function set in the existing interface are included in a function set of the interface to be substituted.

15. The method of claim 13, wherein if an interface to be substituted is a require interface, interface substitutability is determined by verifying whether functions in a function set of the interface to be substituted are included in a function set in the existing interface.

16. The apparatus of claim 1, wherein the providing a function set for the first interface and the providing a function set for the second interface further comprises, listing each function set by parsing an Information Description Language file.

17. The apparatus of claim 1, wherein the listing each function set by parsing an Information Description Language file further comprises verifying the list using a symbol description or a header mapping.

18. The apparatus of claim 1, wherein the updating of the software platform comprising the first interface and the second interface further comprises maintaining a change history of the software platform.

19. A method for automatically determining interface compatibility in component model-based software design, comprising:
determining a first function set and a second function set from a first interface and a second interface, respectively;
determining an interface type, wherein:
when the interface variability type is determined to be an optional variability type, compare functions in the first function set with functions in the second function set;
when the interface variability type is determined to be an alternative variability type, select and set configuration for the first interface, and compare functions in the first function set with functions in the second function set; and
when the interface variability type is determined to be a selective variability type, select and merge the first function set, and compare functions in the first function set with functions in the second function set; and
upon a determination that a function exists in a remainder function list based on the comparisons of functions in the first function set with functions in the second function set, submitting a notification of incompatibility,
wherein the optional variability type selects an interface according to an on state or off state of the interface, the alternative variability type selects one interface from a plurality of related interfaces, and the selective variability type selects any two or more of interfaces for a selective variability type.

* * * * *